May 15, 1934.  E. PAPPERT  1,958,952
HINGE AND ENDPIECE CONSTRUCTION
Filed Jan. 9, 1934
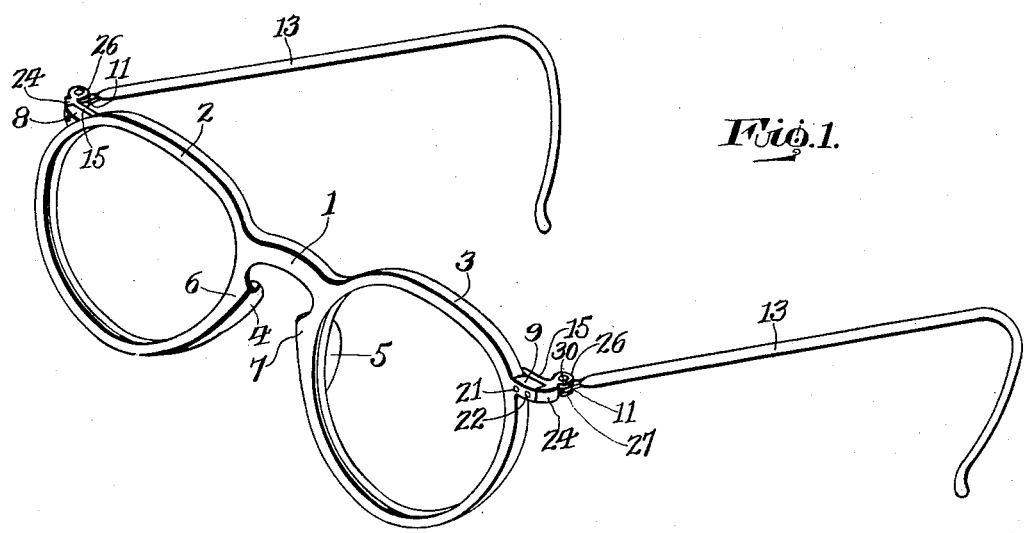
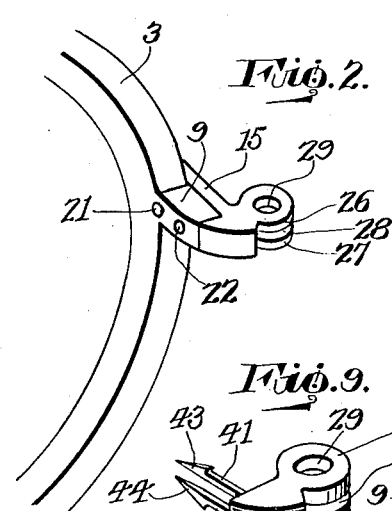
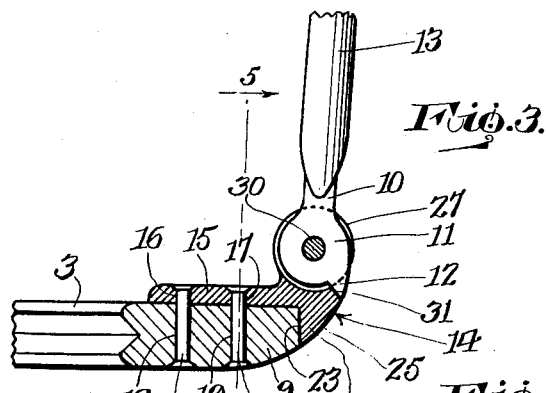
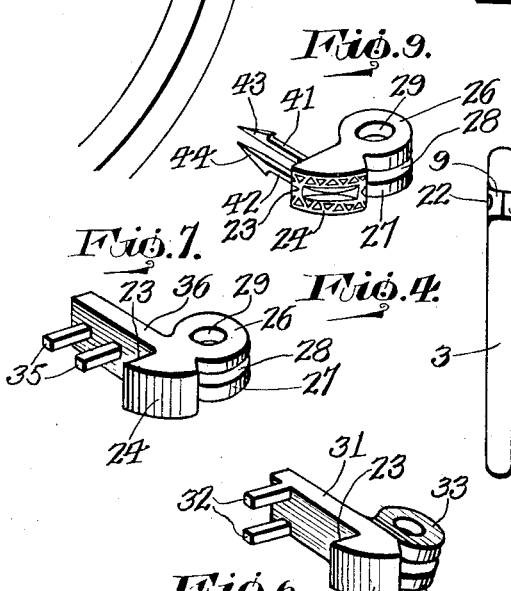
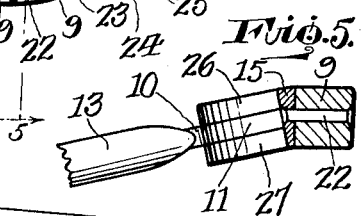
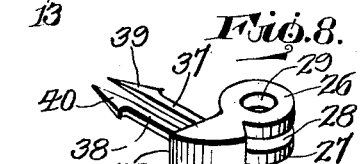
Emanuel Pappert Patented May 15, 1934

1,958,952

UNITED STATES PATENT OFFICE 1,958,952

HINGE AND ENDPIECE CONSTRUCTION

Emanuel Pappert, Long Island City, N. Y., assignor to The Ful-Vue Sales Company, Washington, D. C.

Application January 9, 1934, Serial No. 705,940

11 Claims. (Cl. 88—53)

This invention relates in general to spectacles, and more particularly has reference to a novel endpiece for frames constructed chiefly of non-metallic material, and to a novel disposition of said endpiece with respect to the frame.

In recent years there has been considerable activity in the field of spectacles constructed in whole or in part of non-metallic material or particularly of that material known commercially as zylonite. Many artistic designs have been produced by the combination of zylonite and metal in various attractive ways and in contrasting colors, and the zylonite itself possesses many characteristics which are more desirable in spectacles than those of metal.

However, considerable difficulty has been experienced in providing a suitable hinge construction for spectacles constructed in whole or in part of zylonite material. It has been found that the zylonite itself is wholly unsuited for the formation of any hinge member upon which the temples may be mounted, and it has therefore been necessary to provide metallic hinge constructions and to anchor them into the non-metallic front and temples by some more or less efficient means. Few of those used in the past have proved to be wholly satisfactory.

In view of the above, one of the objects of this invention is to provide an endpiece construction for temple hinge connections, which endpiece construction will be capable of being firmly anchored and accurately positioned with respect to the non-metallic portion of the lens frame, and which will at the same time possess inconspicuous yet pleasing appearance which will add to rather than detract from the appearance of the frame. One of the objects of this invention is that this construction shall be a model of simplicity both in design and in the process of manufacture, and that it shall be of small size yet so arranged as to adequately meet all of the various stresses to which a construction is subjected in actual use.

With the above and other objects in view, this invention contemplates a spectacle frame constructed in a manner similar to that shown in the accompanying drawing and set forth in the following description by way of illustration.

In the drawing:

Figure 1 is a perspective view illustrating a spectacle frame constructed in accordance with this invention.

Figure 2 is an enlarged perspective view illustrating the details of construction of the endpiece of the frame shown in Figure 1.

Figure 3 is an enlarged horizontal section of the endpiece of the frame shown in Figure 1.

Figure 4 is a side elevation of the said frame.

Figure 5 is a sectional view taken along the line 5—5 of Figure 3.

Figures 6, 7, 8 and 9 are perspective views illustrating slightly modified forms of endpieces.

The spectacle front shown in the drawing and particularly as illustrated in Figure 1 is formed of an integral bridge 1 and lens rims 2 and 3 in any conventional manner. The nose pads 4 and 5 are likewise integrally joined to the respective projections 6 and 7 on the nasal sides of the lens rims 2 and 3. At their temple sides, these lens rims 2 and 3 are provided with projecting lugs 8 and 9 respectively extending in a horizontal direction when the spectacles are in their normal position on the face of the wearer and projecting from the lens rims at points located above the normal field of useful side vision. These projecting lugs 8 and 9 are terminated somewhat short of the customary length for an endpiece construction and are for the purpose of receiving and supporting the metallic endpieces presently to be described.

The temples used in connection with this invention may be of any conventional design, those illustrated in the drawing being constructed with metal cores 10 having hinge eyelets 11 and abutments 12 formed at their respective forward ends and then provided with a covering or coating of zylonite 13 or some other material.

The metallic endpiece construction itself consists essentially of a T-shaped metallic member which is generally indicated in the drawing by means of the numeral 14. The leg 15 of this T-shaped member is relatively thin and flat in form and is of substantially the same width as the endpiece supporting lugs 8 and 9 so that when it is placed in the rear of these respective lugs it will lie wholly behind the same and will be substantially concealed from the view of a person looking at the spectacles from the front. This leg 15 is provided with a pair of openings 16 and 17 therethrough, and the respective endpiece supporting lugs 8 and 9 are likewise provided with openings 18 and 19 adapted to register with the openings 16 and 17 in the leg of the T-shaped member. These registering openings are for the purpose of receiving rivets 21 and 22 or the like by which the leg of the endpiece is positively secured to the rear face of the endpiece supporting lug.

One arm of each endpiece has a surface extending substantially at right angles to the endpiece leg and is adapted to contact at 23 with the end surface of the endpiece supporting lug. This arm which is designated at 24 is rounded off on its outer surface 25 to form a continuation of the contour of the endpiece supporting member.

The opposite arm of the T-shaped member is bifurcated to form a pair of opposed hinge ears 26 and 27 having an opening 28 therebetween for receiving the forward end 11 of the temple 13. These ears are substantially circular in contour and are formed with registering openings 29 for the purpose of receiving the pivot 30 which hingedly connects the temples to the endpiece. There is also formed between the ears 26 and 27 an abutment 31 adapted to receive the small projection 12 on the temples and thereby limit the outward movement of the temple about the pivot 30.

When the endpieces are positioned above the normal field of useful side vision as shown in Figures 1 to 4 inclusive, it is necessary that the axis of the temple hinge joint be inclined with respect to the plane of the lenses in order to properly position the spectacles on the face. The leg 15 of the endpiece is therefore made wedge-shaped or wider adjacent the top than adjacent the bottom. Then when the leg 15 is placed with its front face flat against the rear face of the lug 9 as illustrated in Figure 5, the hinge joint will be inclined. By properly forming the angle between the front and rear faces of the leg 15, any desired angle of the temple may be obtained.

It will be appreciated from the above that an endpiece construction has been provided which may be firmly and quickly anchored to the non-metallic lugs provided for the purpose on the spectacle front, such endpiece is extremely simple both in its construction and in the process of manufacture, and that it is a very strong and durable construction not likely to become easily damaged or rendered inoperative.

It is particularly pointed out that by virtue of the strong abutment piece formed by the arm 24 of the T-shaped member there is provided a construction which will enable the endpiece to be positively and accurately positioned with respect to the rest of the frame by simply moving this abutment until it abuts against the end of the endpiece supporting lugs, and after the endpiece has been anchored in place by means of the rivets 21 and 22, this arm 24 serves the purpose of taking up the force exerted tending to bend the endpiece when the temple is opened. It is pointed out in this connection that when the temple is swung to its open position, the part 12 on the temple will bear against the abutment 31 on the endpiece, and were it not for the abutment between the arm 24 and the ends of the endpiece supporting lugs, this force might easily bend or break the hinge member from the relatively thin flat leg 15. Such action however is positively prevented by virtue of the arm just mentioned which is of sufficiently heavy construction to take all such forces and transmit them directly to the endpiece supporting lugs without having to transmit them through the relatively thin and flat leg portion 15.

In Figure 6 there is shown a slightly modified form in which the leg 31 is formed with two integral rivets 32 instead of the individual rivets shown in Figures 3 and 5. These rivets are positioned one above the other. Also, in this form, the barrel or hinge arm consisting of the ears 33 and 34, are positioned with their axis inclined to the leg 31, instead of making one edge of the leg 31 thicker than the other to incline the hinge.

The form shown in Figure 7 is the same as shown in Figures 1 to 5 with the exception that the rivets 35 on the leg 36 are formed integral therewith. It is also noted that the rivets 32 in Figure 6 and the rivets 35 in Figure 7 are squared instead of rounded in Figures 3 and 5.

Figures 8 and 9 illustrate slightly different forms of construction in which the leg of the T-shaped member and the rivets previously described have been replaced by the prongs 37 and 38 in Figure 8 and 41 and 42 in Figure 9. In Figure 8 these prongs 37 and 38 are arranged on substantially the same level, one behind the other and are provided with barbed points 39 and 40. Prongs 37 and 38 project from the abutment surface 23 substantially at right angles thereto, and are adapted to be forced into the end of the endpiece supporting lug to secure the endpiece thereto. The form shown in Figure 9 is substantially the same as that shown in Figure 8 with the exception that the prongs 41 and 42 are positioned one above the other. These prongs are likewise provided with barbed points 43 and 44 adapted to be forced into the endpiece supporting lug. In any of the various forms the outer surface of the part 24 may be provided with suitable engraving as shown in Figure 9.

Attention is directed to the fact that the above described metallic endpieces are of such form that any one form may be made by rolling out a long strip or wire of the proper cross section and cutting off successive short portions of a thickness to form an endpiece. The hinge barrel may then be bifurcated, and with a relatively slight amount of finishing, the complete endpiece may be formed. In the case of the form shown in Figure 6 it will be necessary to mill out between the rivets and in Figure 7 on the opposite sides of the rivets. Likewise, in Figure 8 it will be necessary to mill out on opposite sides of the prongs and in Figure 9, between the prongs, because in either case the rolling would leave a continuous tongue or tongues instead of the individual rivets or prongs. In any case, however, the process of manufacture is relatively simple and inexpensive, and may be carried out very rapidly and accurately.

It is to be clearly understood that the foregoing is by way of illustration only and that the spirit and scope of this invention is not to be limited thereby, but is to be limited only by the prior art and by the terms of the appended claims.

What I claim is:—

1. In a spectacle frame having non-metallic lens rims, a pair of non-metallic endpiece supporting lugs projecting from the respective temple sides of said rims in a substantially horizontal direction, a pair of endpieces each comprising a generally T-shaped metallic member, and a pair of temples, the leg of each T-shaped member being relatively thin and flat and being secured to the rear face of one of said endpiece supporting lugs, one of the arms of each T-shaped member extending forwardly and bearing against the temple end of said endpiece supporting lug to properly position the endpiece laterally with respect to the spectacle frame and to form an abutment for taking up the bending force exerted upon the endpiece when the temple is opened, and the other arm of each T-shaped member extending rearwardly and formed with a hinge connection, said last mentioned arm being bifurcated to form a pair of hinge ears receiving the forward end of one of said temples between them, each T-shaped member also having an abutment between said hinge ears for limiting outward movement of the temple mounted therebetween.

2. In a spectacle frame having non-metallic endpiece supporting parts adjacent its temple sides, a pair of endpieces each comprising a generally T-shaped metallic member, and a pair of temples, the leg of each T-shaped member being relatively thin and flat and being secured to the rear face of one of said endpiece supporting parts, one of the arms of each T-shaped member extending forwardly and bearing against the temple edge of said endpiece supporting part to properly position the endpiece laterally with respect to the spectacle frame and to form an abutment for taking up the bending force exerted upon the endpiece when the temple is opened, and the other arm of each T-shaped member extending rearwardly and formed with a hinge connection, said last mentioned arm being bifurcated to form a pair of hinge ears receiving the forward end of one of said temples between them, each T-shaped member also having an abutment between said hinge ears for limiting outward movement of the temple mounted therebetween.

3. In a spectacle frame having non-metallic endpiece supporting parts adjacent its temple sides, a pair of endpieces each comprising a generally T-shaped metallic member, and a pair of temples, the leg of each T-shaped member being relatively thin and flat and being secured to the rear face of one of said endpiece supporting parts, one of the arms of each T-shaped member extending forwardly and bearing against the temple edge of said endpiece supporting part to properly position the endpiece laterally with respect to the spectacle frame and to form an abutment for taking up the bending force exerted upon the endpiece when the temple is opened, and the other arm of each T-shaped member extending rearwardly and formed with a bifurcated hinge connection hingedly receiving one of said temples, each T-shaped member also having an abutment within said bifurcated hinge connection for limiting the outward movement of the temple mounted therein.

4. In a spectacle frame having non-metallic endpiece supporting parts adjacent its temple sides, a pair of endpieces each comprising a generally T-shaped metallic member and a pair of temples, the leg of each T-shaped member being relatively thin and flat and being secured to the rear face of one of said endpiece supporting parts, one of the arms of each T-shaped member extending forwardly and bearing against the temple edge of said endpiece supporting part to properly position the endpiece laterally with respect to the spectacle frame and to form an abutment for taking up the bending force exerted upon the endpiece when the temple is opened, and the other arm of each T-shaped member extending rearwardly and formed with a hinge connection hingedly receiving one of said temples, each T-shaped member also having an abutment forming a part of said hinge connection for limiting outward movement of the temple mounted therein.

5. In a spectacle frame having non-metallic endpiece supporting parts adjacent its temple sides, a pair of endpieces each comprising a generally T-shaped metallic member, and a pair of temples, the leg of each T-shaped member being secured to one of said endpiece supporting parts, one of the arms of each T-shaped member extending forwardly and bearing against the temple edge of said endpiece supporting part to properly position the endpiece laterally with respect to the spectacle frame and to form an abutment for taking up the bending force exerted upon the endpiece when the temple is opened, and the other arm of each T-shaped member extending rearwardly and formed with a bifurcated hinge connection hingedly receiving one of said temples, each T-shaped member also having an abutment within said bifurcated hinge connection for limiting the outward movement of the temple mounted therein.

6. In a spectacle frame having non-metallic endpiece supporting parts adjacent its temple sides, a pair of metallic endpieces, and a pair of temples, each of said endpieces having a laterally extending part secured to one of said endpiece supporting parts, an arm extending forwardly from said laterally extending part and bearing against the temple edge of said endpiece supporting part to properly position the endpiece laterally with respect to the spectacle frame and to form an abutment for taking up the bending force exerted upon the endpiece when the temple is opened, and another arm extending rearwardly and formed with a hinge connection hingedly receiving one of said temples, each endpiece also having an abutment forming a part of said hinge connection for limiting the outward movement of the temple mounted therein.

7. In a spectacle frame having non-metallic endpiece supporting parts adjacent its temple sides, a pair of endpieces each comprising a generally T-shaped metallic member, and a pair of temples, the leg of each T-shaped member being relatively thin and flat and being secured to the rear face of one of said endpiece supporting parts, one of the arms of each T-shaped member extending forwardly and bearing against the temple edge of said endpiece supporting part to properly position the endpiece laterally with respect to the spectacle frame and to form an abutment for taking up the bending force exerted upon the endpiece when the temple is opened, and the other arm of each T-shaped member extending rearwardly and formed with a bifurcated hinge connection hingedly receiving one of said temples, each T-shaped member also having an abutment within said bifurcated hinge connection for limiting the outward movement of the temple mounted therein, each leg being thicker at its upper edge than adjacent its lower edge, whereby said hinge connections will be disposed at an inclination with respect to the rear faces of said endpiece supporting parts and the temples inclined with respect to the plane of the spectacle front.

8. In a spectacle frame having non-metallic endpiece supporting parts adjacent its temple sides, a pair of endpieces each comprising a generally T-shaped metallic member, and a pair of temples, the leg of each T-shaped member being relatively thin and flat and being secured to the rear face of one of said endpiece supporting parts, one of the arms of each T-shaped member extending forwardly and bearing against the temple edge of said endpiece supporting part to properly position the endpiece laterally with respect to the spectacle frame and to form an abutment for taking up the bending force exerted upon the endpiece when the temple is opened, and the other arm of each T-shaped member extending rearwardly and formed with a bifurcated hinge connection hingedly receiving one of said temples, each T-shaped member also having an abutment within said bifurcated hinge connection for limiting the outward movement of the temple mounted therein, each temple connection having its axis disposed at an inclination with respect to the leg of the T-shaped member, whereby the temples disposed in said temple connections will be inclined with respect to the plane of the spectacle front.

9. In a spectacle frame having non-metallic endpiece supporting parts adjacent its temple sides, a pair of endpieces each comprising a generally T-shaped metallic member, and a pair of temples, the leg of each T-shaped member being relatively thin and flat and being secured to the rear face of one of said endpiece supporting parts, one of the arms of each T-shaped member extending forwardly and bearing against the temple edge of said endpiece supporting part to properly position the endpiece laterally with respect to the spectacle frame and to form an abutment for taking up the bending force exerted upon the endpiece when the temple is opened, and the other arm of each T-shaped member extending rearwardly and formd with a bifurcated hinge connection hingedly receiving one of said temples, each T-shaped member also having an abutment within said bifurcated hinge connection for limiting the outward movement of the temple mounted therein, each temple connection having its axis disposed at an inclination with respect to the plane of the spectacle front.

10. In a spectacle frame having non-metallic endpiece supporting parts adjacent its temple sides, a pair of endpieces each comprising a generally T-shaped metallic member, and a pair of temples, the leg of each T-shaped member being relatively thin and flat and being secured to the rear face of one of said endpiece supporting parts, one of the arms of each T-shaped member extending forwardly and bearing against the temple edge of said endpiece supporting part to properly position the endpiece laterally with respect to the spectacle frame and to form an abutment for taking up the bending force exerted upon the endpiece when the temple is opened, and the other arm of each T-shaped member extending rearwardly and formed with a bifurcated hinge connection hingedly receiving one of said temples, each T-shaped member also having an abutment within said bifurcated hinge connection for limiting the outward movement of the temple mounted therein, and rivets on each leg of said T-shaped members for extending into said endpiece supporting parts to secure the endpieces in place thereon.

11. In a spectacle frame having non-metallic endpiece supporting parts adjacent its temple sides, a pair of metallic endpieces, and a pair of temples, each of said endpieces having a pair of laterally extending barbed prongs extending into one of said endpiece supporting parts, an arm extending forwardly from said laterally extending prongs and bearing against the temple edge of said endpiece supporting part to properly position the endpiece laterally with respect to the spectacle frame and to form an abutment for taking up the bending force exerted upon the endpiece when the temple is opened, and another arm extending rearwardly and formed with a hinge connection hingedly receiving one of said temples, each endpiece also having an abutment forming a part of said hinge connection for limiting the outward movement of a temple mounted therein.

EMANUEL PAPPERT.